United States Patent
Matsumoto et al.

(10) Patent No.: US 7,214,098 B2
(45) Date of Patent: May 8, 2007

(54) MEMORY CARD CONNECTOR

(76) Inventors: Yasuyoshi Matsumoto, Heights-Ichikawa-Daisan #305, 12-19 Chou 6-chome, Yamato-shi, Kanagawa 242-0021 (JP); Mitsuhiro Tomita, 6-5-719, Nishi-tsuruma 3-chome, Yamato-shi, Kanagawa 242-0005 (JP)

( * ) Notice: Subject to any disclaimer, the term of this patent is extended or adjusted under 35 U.S.C. 154(b) by 0 days.

(21) Appl. No.: 10/529,826

(22) PCT Filed: Sep. 26, 2003

(86) PCT No.: PCT/US03/30535

§ 371 (c)(1),
(2), (4) Date: Sep. 12, 2005

(87) PCT Pub. No.: WO2004/032287

PCT Pub. Date: Apr. 15, 2004

(65) Prior Publication Data

US 2006/0128225 A1    Jun. 15, 2006

(30) Foreign Application Priority Data

Oct. 3, 2002    (JP) .............................. 2002/290655

(51) Int. Cl.
*H01R 24/00* (2006.01)
(52) U.S. Cl. ..................................................... 439/630
(58) Field of Classification Search ................ 439/630, 439/377, 946, 325
See application file for complete search history.

(56) References Cited

U.S. PATENT DOCUMENTS

| | | | |
|---|---|---|---|
| 6,129,572 A * | 10/2000 | Feldman et al. ............. | 439/328 |
| 6,129,588 A * | 10/2000 | Chang .......................... | 439/630 |
| 6,168,082 B1 * | 1/2001 | Benjamin et al. ........... | 235/475 |
| 6,478,595 B2 * | 11/2002 | Nishioka ..................... | 439/188 |
| 6,655,972 B2 * | 12/2003 | Sato ............................ | 439/159 |
| 6,840,807 B2 * | 1/2005 | Ooya et al. .................. | 439/630 |
| 6,851,959 B2 * | 2/2005 | Ooya et al. .................. | 439/159 |
| 6,863,570 B2 * | 3/2005 | Chen ........................... | 439/630 |
| 2002/0052132 A1 * | 5/2002 | Sato ............................ | 439/159 |
| 2003/0119350 A1 * | 6/2003 | Chen ........................... | 439/159 |
| 2005/0106944 A1 * | 5/2005 | Kuo ............................. | 439/630 |
| 2005/0208804 A1 * | 9/2005 | Kikuchi et al. .............. | 439/159 |
| 2005/0208805 A1 * | 9/2005 | Kodera et al. ............... | 439/159 |
| 2005/0221649 A1 * | 10/2005 | Tanaka et al. ............... | 439/159 |

* cited by examiner

Primary Examiner—Ross Gushi

(57) ABSTRACT

A memory card connector includes a front receptacle area communicating with an interior cavity for receiving a memory card. The connector has an L-shaped insulating housing which includes a rear terminal-mounting section extending transversely across a rear of the cavity, and a longitudinal side wall section extending forwardly of one end of the rear section defining one side of the cavity. A plurality of terminals are mounted in a side-by-side array along the rear terminal-mounting section of the housing and have contact portions at a rear of the cavity for engaging contacts on the memory card. A metal shell covers at least a portion of the insulating housing and includes a cover plate defining a top of the cavity and a longitudinal side wall plate depending from the cover plate and defining a side of the cavity opposite said side defined by the longitudinal side wall section of the housing.

16 Claims, 5 Drawing Sheets

MEMORY CARD CONNECTOR

FIELD OF THE INVENTION

This invention generally relates to the art of electrical connectors and, particularly, to a memory card connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card. Ejecting devices often are provided for facilitating inserting and ejecting the memory card to and from the card connector.

A typical memory card connector includes a U-shaped insulating housing structure having a lateral terminal-mounting section across the rear of the connector. The contacts or terminals of the connector are mounted on this lateral section. Two legs project at right angles forwardly from opposite sides of the rear lateral section to define longitudinal opposite sides of a cavity for receiving a memory card. An overlying shell substantially covers the insulating housing and includes a cover plate defining a top of the cavity and a pair of side walls overlying the side legs of the housing. Examples of such a memory card connector are shown in Japan Patent Laid-Open Nos. 2001-6777 and 2002-83651.

With the typical prior art memory card connectors as described above, the card-receiving cavity, in essence, is defined by the rear lateral section and the opposite side legs of the U-shaped housing as well as the top cover plate of the metal shell. The opposite longitudinal side legs of the housing cannot be reduced in lateral size and weight below certain limits because of the necessary resistive forces required for guiding the memory card in its movement into and out of the cavity. The present invention is directed to solving this problem by providing a connector which is reduced both in size and weight.

SUMMARY OF THE INVENTION

An object, therefore, of the invention is to provide a new and improved memory card connector of the character described.

In the exemplary embodiment of the invention, the connector has a front receptacle area communicating with an interior cavity for receiving a memory card. An L-shaped insulating housing has a rear terminal-mounting section extending transversely across the rear of the cavity. A longitudinal side wall section extends forwardly from one end of the rear section and defines one side of the cavity. A plurality of terminals are mounted in a side-by-side array along the rear terminal-mounting section of the housing and have contact portions at the rear of the cavity for engaging contacts on the memory card. A metal shell covers at least a portion of the insulating housing and includes a cover plate defining a top of the cavity. The metal shell also includes a longitudinal side wall plate depending from the cover plate and defining a side of the cavity opposite the side defined by the longitudinal side wall section of the housing.

As disclosed herein, the metal shell is stamped and formed of sheet metal material. The cover plate of the metal shell is of a sufficient size to cover substantially the entire area of the insulating housing. The shell includes a second longitudinal side wall plate depending from the cover plate and overlying the longitudinal side wall section of the housing. The side wall plate of the metal shell that defines the side of the cavity opposite the side defined by the longitudinal side wall section of the housing includes a number of features. Specifically, the side wall plate includes at least one mounting tab bent outwardly at the bottom edge of the plate for mounting the connector on a circuit board. The side wall plate includes a longitudinal bottom flange bent inwardly at the bottom edge of the plate for guiding the memory card into and out of the cavity. The side wall plate also includes a slide projection extending into the cavity for engaging a side edge of the memory card to reduce friction with the card as the card moves into and out of the cavity. In the preferred embodiment, the slide projection is formed by a narrow boss which is elongated in the direction of movement of the memory card.

Other features of the connector include complementary interengaging snap-latch means between the housing and the metal shell to snappingly mount the shell to the housing. In addition, a card ejection mechanism is provided on the longitudinal side wall section of the housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
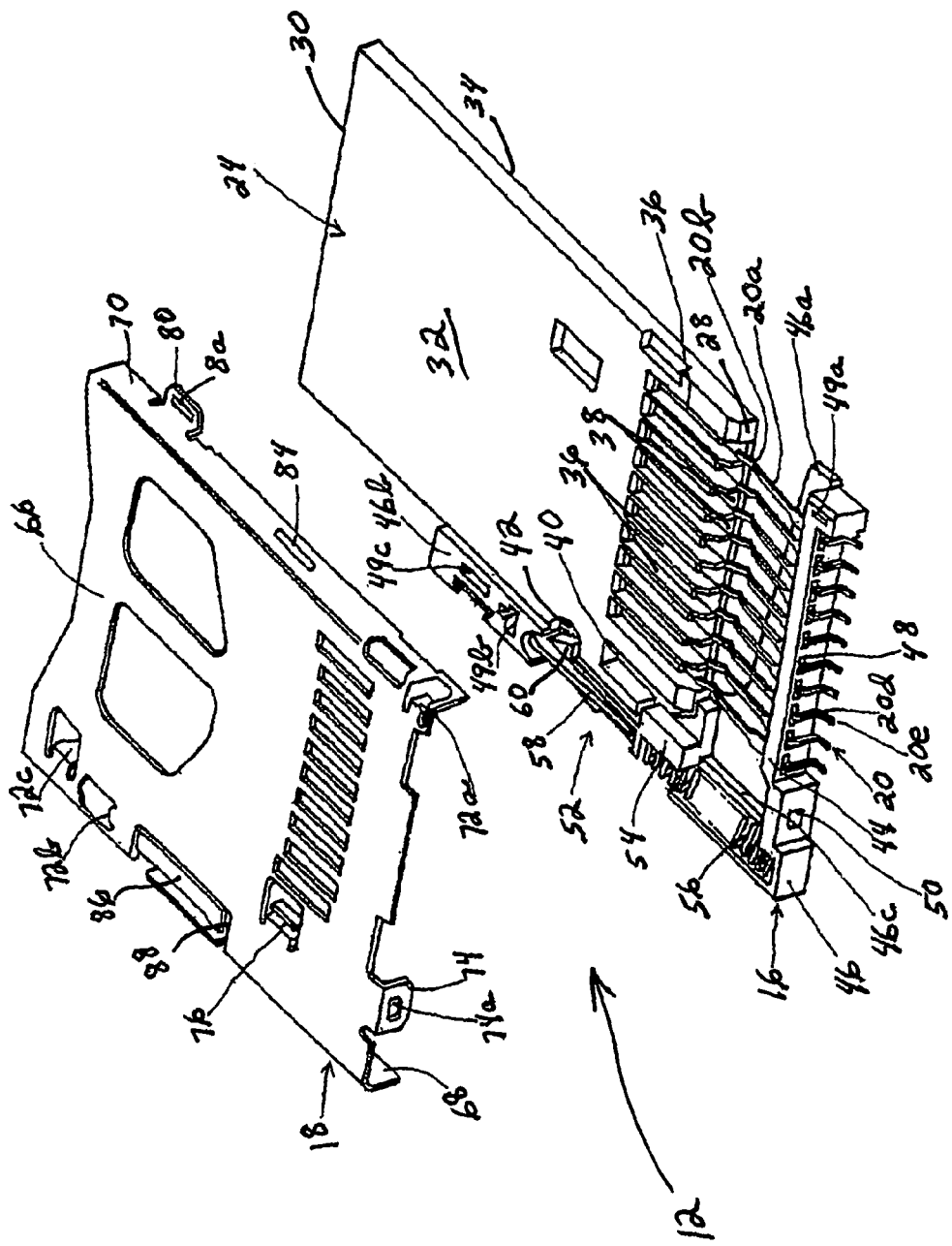
FIG. 1 is a perspective view of a memory card connector according to one embodiment of the invention, with the metal shell lifted to facilitate the illustration.

Referring to the drawings in greater detail, and first to FIGS. 1 and 4–8, the invention is embodied in a memory card connector, generally designated 12, which includes an insulating housing, generally designated 16, and a stamped and formed sheet metal shell, generally designated 18, covering the insulating housing. The housing mounts a plurality of conductive terminals, generally designated 20, mounted on the housing in a side-by-side array transversely across a rear of the housing as seen in FIG. 1. The housing and metal shell 18 combine to define a cavity, generally designated 22 (FIG. 7) for receiving a memory card, generally designated 24, inserted into a front receptacle area 26 (FIG. 4) of the connector in the direction of arrow "A".

As best seen in FIG. 1, memory card 24, when properly oriented for insertion into the connector, includes a front leading edge 28, a rear trailing edge 30, a top flat surface 32 and a bottom flat surface 34. A plurality of contact slots 36 are cut into top flat surface 32, with the slots opening at front leading edge 28 of the card. Contacts 38 are disposed at the bottoms of the slots for engaging contact portions of terminals 20. A wrong insertion-proof slot 40 is cut into top flat surface 32 of the card. Finally, a recess 42 is cut into one side edge of the card, for purposes described hereinafter.

Figure 2:
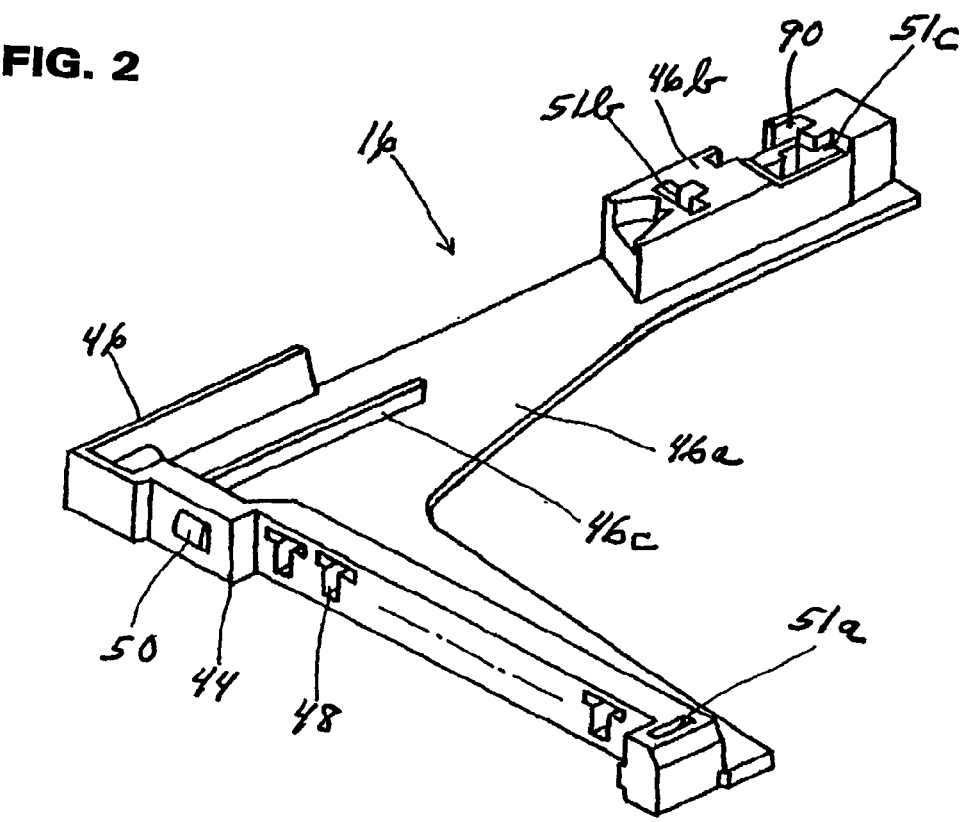
FIG. 2 is a perspective view of the L-shaped housing of the connector.

Insulating housing 16 is shown best in FIG. 2 but also in conjunction with FIG. 1. The housing is generally L-shaped to define a terminal-mounting section 44 which extends transversely across the rear of the housing, along with a longitudinal side wall section 46 which includes a thin bottom plate 46a. The side wall section extends forwardly atone end of rear terminal-mounting section 44, generally at a right-angle thereto, and also includes a side wall block 46b. A guide rail 46c extends parallel to the longitudinal side wall section towards side wall block 46b. A plurality of terminal-receiving passages 48 extend through rear terminal-mounting section 44. For purposes to be described in greater detail hereinafter, a latch boss 50 projects outwardly from the rear surface of the terminal-mounting section. Finally, a top mounting slot 51a is formed in the distal end of terminal mounting section 44 and two top mounting slots 51b and 51c are formed in the top of side wall block 46b for facilitating the mounting of metal shell 18 to the housing as will be seen hereinafter.

Figure 3:
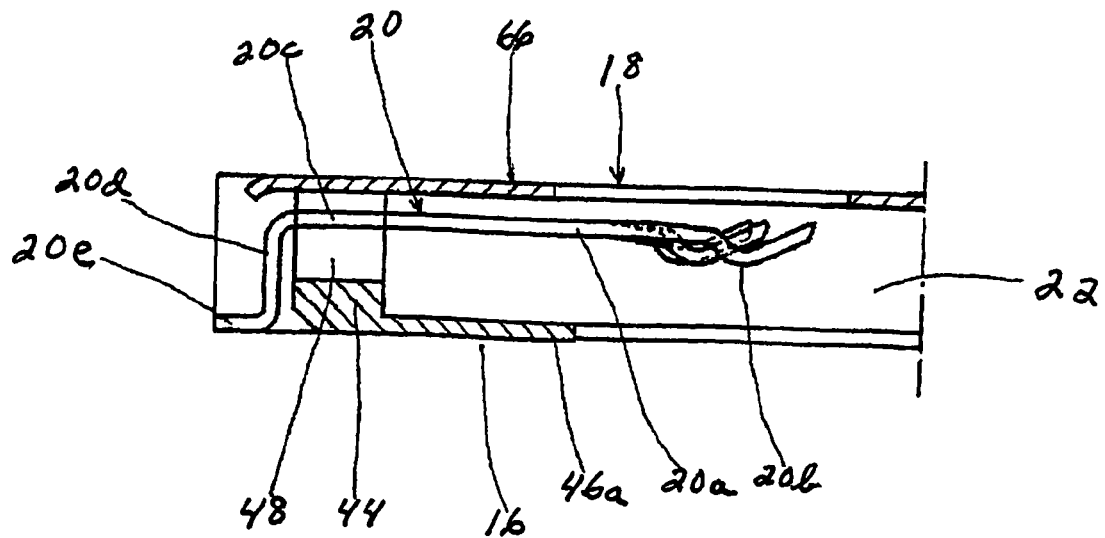
FIG. 3 is an enlarged, fragmented vertical section through the rear terminal-mounting section of the housing to illustrate the terminals of the connector.

Referring to FIG. 3 in conjunction with FIGS. 1 and 2, each terminal 20 includes a contact arm 22a cantilevered forwardly into the card-receiving cavity 22 and terminating in a contact portion 20b for engaging a respective one of the contacts 38 in a respective contact slot 36 in memory card 24. Contact arm 20a projects forwardly from a mounting base 20c of the terminal which is press-fit into a respective one of the terminal-receiving passages 48 in terminal-mounting section 44 of the housing. A solder tail portion 20d of the terminal projects outwardly of the rear of the housing and terminates in a soldering pad 20e for solder-connection to a respective circuit trace on a printed circuit board (not shown). The housing has a plurality mounting pegs 53 (FIGS. 6–9) for insertion into appropriate mounting holes in the printed circuit board.

Longitudinal side wall section 46 of housing 16 mounts a push/pull-type card ejection mechanism, generally designated 52 in FIG. 1. The card ejection mechanism is provided for ejecting and removing memory card 24 from the connector and is of a type known in the art. Suffice it to say, the card ejection mechanism includes a slider 54 slidable on bottom plate 46a of longitudinal side wall section 46, a coil spring 56 for urging the slider toward the front receptacle area 26 (FIG. 4) of the connector, a pin member 58 for cooperating with a heart-shaped cam slot (not shown) in the slider. The push/pull-type card ejection mechanism 52 is well known in the art. When memory card 24 is inserted into card-receiving cavity 22, a locking arm 60 of the slider is caught by recess 42 in the side edge of the card so that the slider moves with the card in its insertion direction while compressing coil spring 56. When the card is unlatched, it is ejected from the card-receiving cavity under the force of coil spring 56. The initial and fully inserted positions of the memory card are shown by the phantom lines in FIGS. 4–6.

Figure 4:
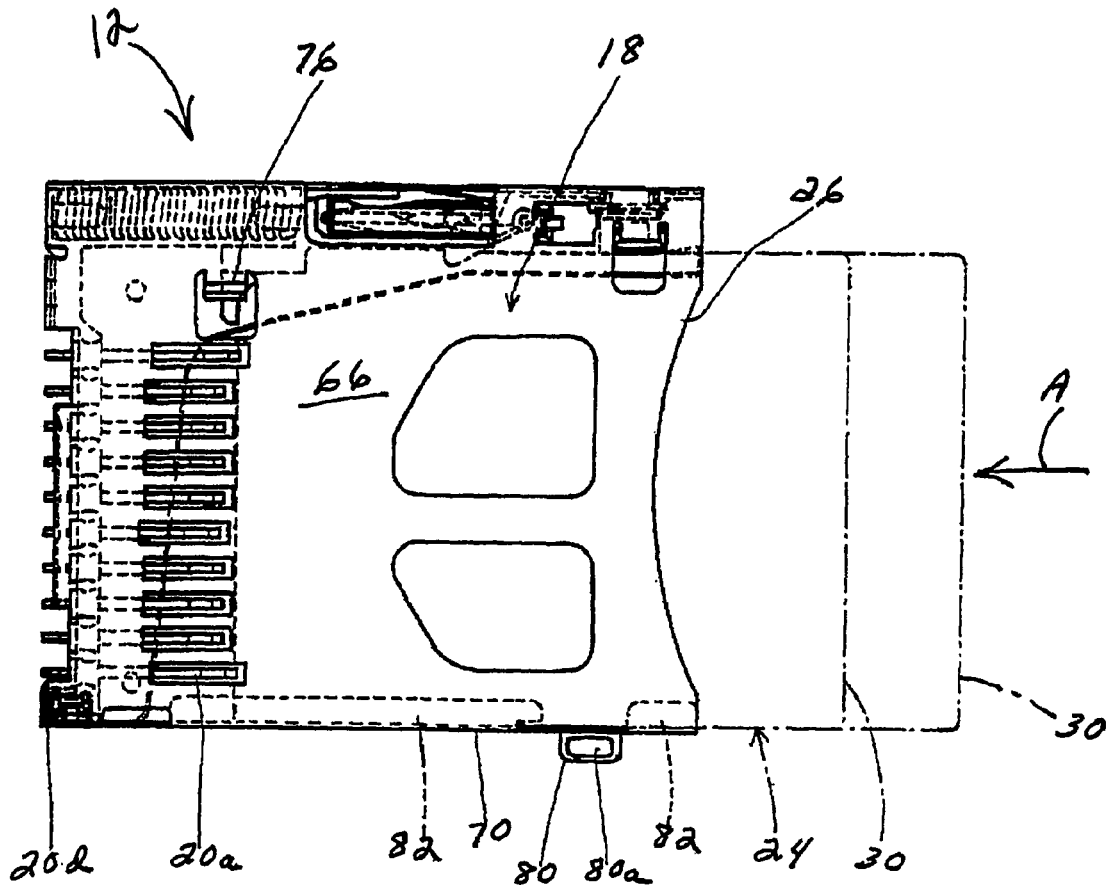
FIG. 4 is a top plan view of the connector.
Figure 5:
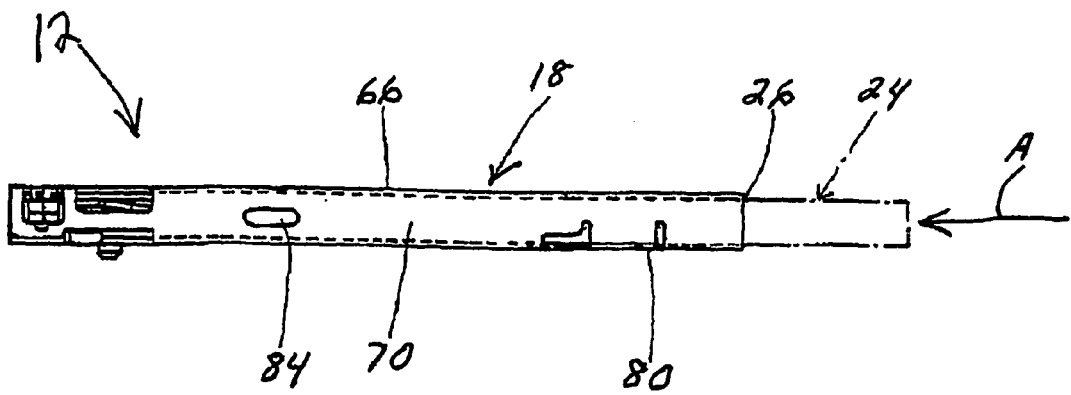
FIG. 5 is a side elevational view of the connector, looking at the bottom or left-hand side as viewed in FIG. 4.
Figure 6:
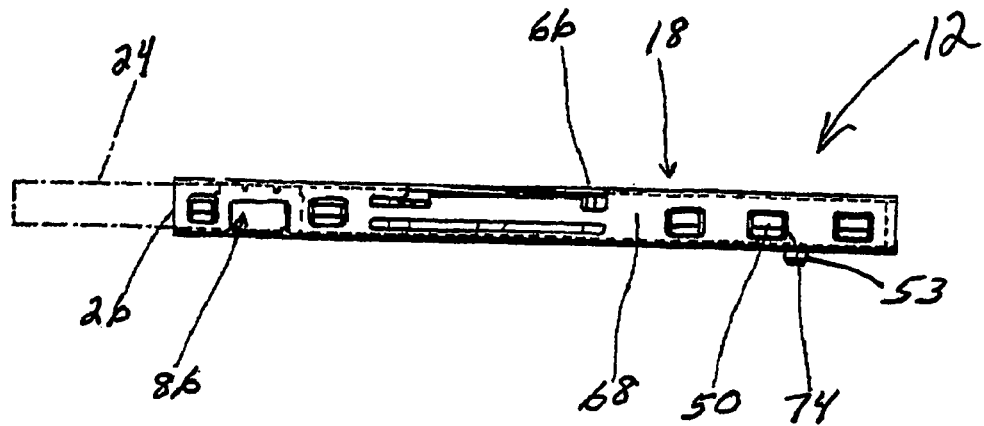
FIG. 6 is a side elevational view of the connector, opposite the side of FIG. 5.
Figure 7:
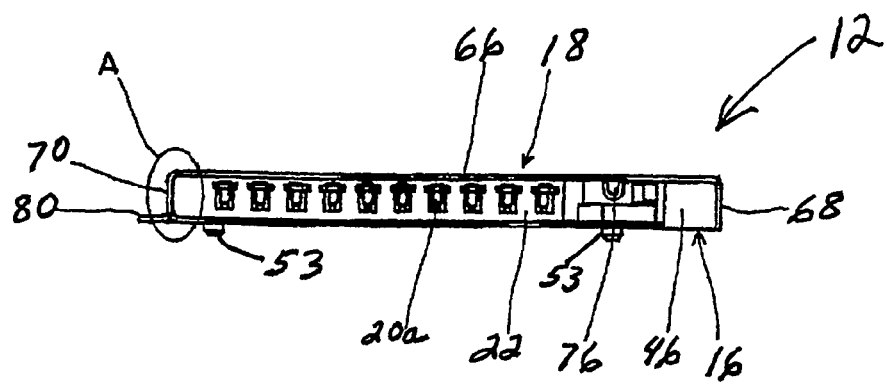
FIG. 7 is a front elevational view of the connector.
Figure 8:
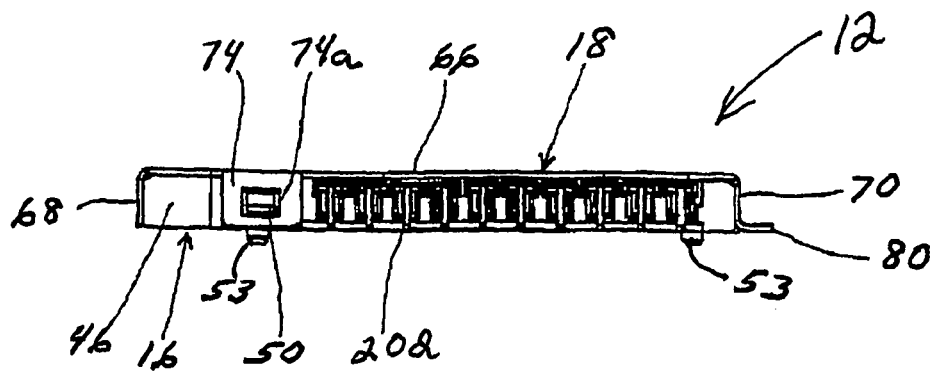
FIG. 8 is a rear elevational view of the connector.

Referring to FIGS. 1 and 4–8, metal shell 18 is stamped and formed of sheet metal material and is large enough to cover substantially the entire area defined by insulating housing 16. The metal shell includes a top cover plate 66 and a pair of depending opposite side wall plates 68 and 70 which run in a front-to-rear direction of the connector. Side wall plate 68 covers card ejection mechanism 52 and longitudinal side wall section 46 of the housing. Side wall plate 70 defines the opposite side of card-receiving cavity 22 as best seen in FIGS. 4 and 7. A plurality of depending mounting tabs 72a, 72b and 72c are stamped and formed out of the shell for press-fit into top mounting slots 51a, 51b and 51c, respectively, of the housing. A latch tab 74 at the rear of the metal shell has an opening 74a for snap-latch engagement with latch boss 50 of the housing. Therefore, when the shell is mounted to the housing, mounting tabs 72a–72c of the shell are press-fit into mounting slots 51a–51c of the housing, and latch tab 74 of the shell snaps over latch boss 50 of the housing.

Metal shell 18 also has a wrong insertion-proof projection 76 which is stamped and formed out of cover plate 66 of the shell and depends downwardly into slot 40 (FIG. 1) in top surface 32 of memory card 24 when the card is properly inserted into the connector. When the card is inserted upside-down or front-side-back, projection 76 prevents the card from engaging contact portions 20b of terminals 20.

Figure 9:
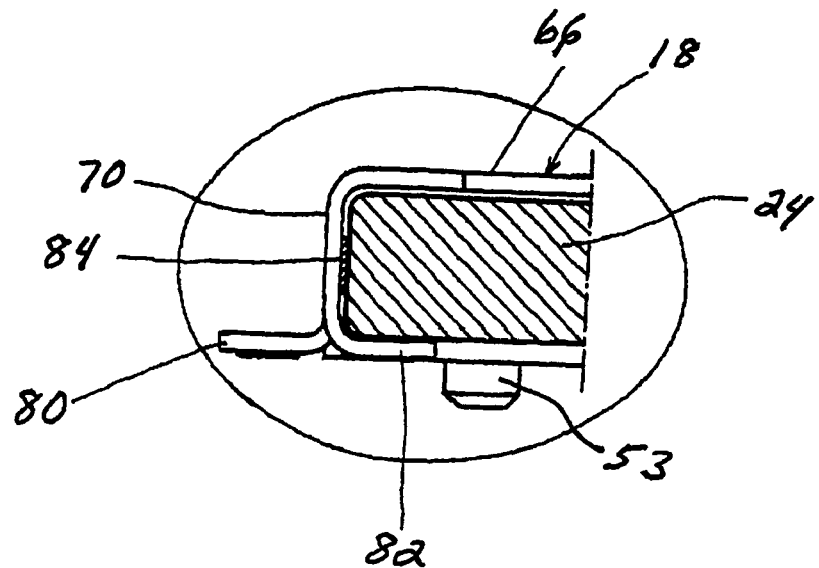
FIG. 9 is an enlarged, fragmented vertical section in the area encircled at "A" in FIG. 7.

Side wall plate 70 of metal shell 18 includes a number of features, with particular reference to FIG. 9. First, at least one mounting tab 80, having a mounting hole 80a, is bent outwardly at the bottom edge of the side wall plate for mounting the connector on a circuit board. Secondly, side wall plate 70 of the metal shell includes a longitudinal bottom flange 82 bent inwardly at the bottom edge of the side wall plate for guiding the memory card into and out of cavity 22. Thirdly, side wall plate 70 includes a slide projection 84 extending into the cavity for engaging a side edge of the memory card to reduce friction with the card as the card moves into and out of the cavity. As seen best in FIG., slide projection 84 is a narrow boss elongated in the direction of movement of the memory card and embossed inwardly from side wall plate 70.

Finally, a metal fitting nail 86 (FIGS. 1 and 6) is inserted downwardly through an opening 88 (FIG. 1) in metal shell 18 and a slot 90 (FIG. 2) in housing 16 for securing the connector, as by soldering, to an appropriate mounting pad on the printed circuit board.

From the foregoing, it can be seen that rear terminal-mounting section 44 and longitudinal side wall section 46 of L-shaped housing 16 form the rear and one side of card-receiving cavity 22. Metal shell 18 includes a cover plate 66 and a side wall plate 70 which form the top and the opposite side, respectively, of the cavity. This unique combination reduces the size and weight of the overall connector.

Figure 10:
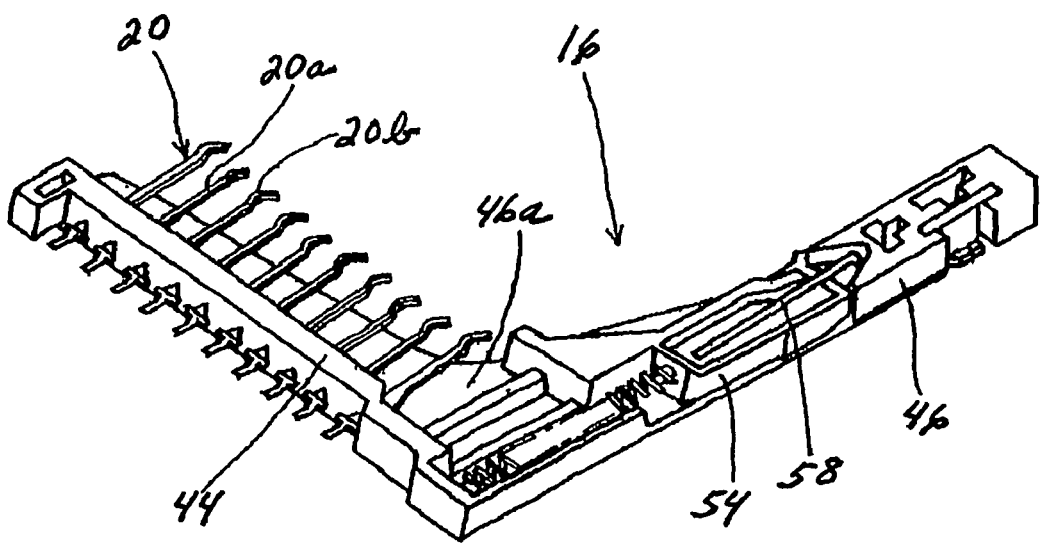
FIG. 10 is a perspective view of an insulating housing according to another embodiment of the invention.

Finally, FIG. 10 shows an alternative embodiment of the invention wherein side wall section 46 of housing 16 has been moved to the opposite end of rear terminal-mounting section 44 from the first embodiment as shown best in FIG. 2. With this alternative embodiment, side wall plates 68 and 70 of metal shell 18 simply would be reversed and the connector would otherwise be similarly constructed and similarly operated. Again, the housing of the alternative embodiment would form the rear and one side of the card-receiving cavity, while the metal shell would form the top and the opposite side of the cavity, again reducing the size and weight of prior art connectors.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector having a front receptacle area communicating with an interior cavity for receiving a memory card, comprising:
   an L-shaped insulating housing having a rear terminal-mounting section extending transversely across a rear of the cavity, and a longitudinal side wall section extending forwardly of one end of the rear section defining one side of the cavity;
   a plurality of terminals mounted in a side-by-side array along the rear terminal-mounting section of the housing and having contact portions at a rear of the cavity for engaging contacts on the memory card; and
   a metal shell covering at least a portion of the insulating housing and including a cover plate defining a top of the cavity and a longitudinal side wall plate depending from the cover plate and defining a side of the cavity opposite said side defined by the longitudinal side wall section of the housing.

2. The memory card connector of claim 1 wherein the cover plate of said metal shell is of a sufficient size to cover substantially the entire area of said insulating housing.

3. The memory card connector of claim 1 wherein said metal shell includes a second longitudinal side wall plate depending from the cover plate and overlying the longitudinal side wall section of the housing.

4. The memory card connector of claim 1 wherein said side wall plate of the metal shell includes at least one mounting tab bent outwardly at the bottom of the plate for mounting the connector on a circuit board.

5. The memory card connector of claim 1 wherein said side wall plate of the metal shell includes a longitudinal bottom flange bent inwardly at a bottom edge of the plate for guiding the memory card into and out of said cavity.

6. The memory card connector of claim 1 wherein said side wall plate of the metal shell includes a slide projection extending into the cavity for engaging a side edge of the memory card to reduce friction with the card as the card moves into and out of said cavity.

7. The memory card connector of claim 6 wherein said slide projection comprises a narrow boss elongated in the direction of movement of the memory card.

8. The memory card connector of claim 1 wherein said metal shell is stamped and formed of sheet metal material.

9. The memory card connector of claim 1, including complementary interengaging snap-latch means between the housing and the metal shell to snappingly mount the shell to the housing.

10. The memory card connector of claim 1, including a card ejection mechanism on the longitudinal side wall section of the housing.

11. A memory card connector having a front receptacle area communicating with an interior cavity for receiving a memory card, comprising:
    an L-shaped insulating housing having a rear terminal-mounting section extending transversely across a rear of the cavity, and a longitudinal side wall section extending forwardly of one end of the rear section defining one side of the cavity;
    a plurality of terminals mounted in a side-by-side array along the rear terminal-mounting section of the housing and having contact portions at a rear of the cavity for engaging contacts on the memory card; and
    a metal shell stamped and formed of sheet metal material covering at least a portion of the insulating housing and including a cover plate defining a top of the cavity and a longitudinal side wall plate depending from the cover plate and defining a side of the cavity opposite said side defined by the longitudinal side wall section of the housing, the side wall plate including at least one mounting tab bent outwardly at the bottom of the plate for mounting the connector on a circuit board, the side wall plate including a longitudinal bottom flange bent inwardly at a bottom edge of the plate for guiding the memory card into and out of said cavity, and the side wall plate including a slide projection extending into the cavity for engaging a side edge of the memory card to reduce friction with the card as the card moves into and out of said cavity.

12. The memory card connector of claim 11 wherein the cover plate of said metal shell is of a sufficient size to cover substantially the entire area of said insulating housing.

13. The memory card connector of claim 11 wherein said metal shell includes a second longitudinal side wall plate depending from the cover plate and overlying the longitudinal side wall section of the housing.

14. The memory card connector of claim 11 wherein said slide projection comprises a narrow boss elongated in the direction of movement of the memory card.

15. The memory card connector of claim 11, including complementary interengaging snap-latch means between the housing and the metal shell to snappingly mount the shell to the housing.

16. The memory card connector of claim 11, including a card ejection mechanism on the longitudinal side wall section of the housing.

\* \* \* \* \*